(12) United States Patent
Garti

(10) Patent No.: US 8,341,789 B2
(45) Date of Patent: Jan. 1, 2013

(54) POOL CLEANING ROBOT

(75) Inventor: Efraim Garti, Zirchon Yaakov (IL)

(73) Assignee: Maytronics Ltd., Kibbutz Yizrael (IL)

( * ) Notice: Subject to any disclaimer, the term of this patent is extended or adjusted under 35 U.S.C. 154(b) by 795 days.

(21) Appl. No.: 12/482,129

(22) Filed: Jun. 10, 2009

(65) Prior Publication Data

US 2009/0307854 A1    Dec. 17, 2009

Related U.S. Application Data

(60) Provisional application No. 61/129,225, filed on Jun. 12, 2008.

(51) Int. Cl.
*E04H 4/16* (2006.01)
(52) U.S. Cl. ................... 15/1.7; 210/167.16
(58) Field of Classification Search ............ 15/1.7; 210/167.16, 167.17; *E04H 4/16*
See application file for complete search history.

(56) References Cited

U.S. PATENT DOCUMENTS

| | | | | |
|---|---|---|---|---|
| 4,920,465 A * | 4/1990 | Sargent | | 362/96 |
| 4,939,806 A * | 7/1990 | Supra | | 15/1.7 |
| 5,001,800 A * | 3/1991 | Parenti et al. | | 15/1.7 |
| 5,337,434 A * | 8/1994 | Erlich | | 15/1.7 |
| 5,435,031 A * | 7/1995 | Minami et al. | | 15/1.7 |
| 5,507,058 A * | 4/1996 | Minami et al. | | 15/1.7 |
| 5,617,600 A * | 4/1997 | Frattini | | 15/1.7 |
| 6,039,886 A * | 3/2000 | Henkin et al. | | 210/776 |
| 6,299,699 B1 * | 10/2001 | Porat et al. | | 134/6 |
| 6,663,011 B1 * | 12/2003 | Entleutner | | 237/12.1 |
| 7,520,282 B2 * | 4/2009 | Stoltz | | 134/45 |
| 7,658,375 B2 * | 2/2010 | Wong et al. | | 271/164 |
| 7,849,547 B2 * | 12/2010 | Erlich et al. | | 15/1.7 |
| 2004/0231075 A1 * | 11/2004 | Stoltz | | 15/1.7 |
| 2008/0060984 A1 * | 3/2008 | Henkin et al. | | 210/143 |
| 2008/0087299 A1 * | 4/2008 | Erlich et al. | | 134/6 |
| 2009/0045110 A1 * | 2/2009 | Garti | | 210/167.16 |

* cited by examiner

*Primary Examiner* — Robyn Doan
*Assistant Examiner* — Tatiana Nobrega
(74) *Attorney, Agent, or Firm* — Oren Reches

(57) ABSTRACT

A suction-powered pool cleaning robot is provided, including a fluid outlet, configured for connection to a suction hose, and a fluid inlet, with a fluid path therebetween, a turbine, which may be any suitable device is configured to extract energy, such as in the form of rotational motion, from a fluid flow, at least partially disposed within the fluid path so as to extract energy from flow of fluid therethrough, and an electrical control system configured to regulate at least some of the operations of the robot, the control system including an electrical generator for providing power to the control system and configured to be driven by the turbine, and an electronic controller configured for the regulation.

8 Claims, 8 Drawing Sheets

POOL CLEANING ROBOT

This is a Non-Provisional Application filed Jun. 10, 2009, an application claiming the benefit under 35 U.S.C. 119(e) U.S. Provisional Application No. 61/129,225, filed Jun. 12, 2008, the content of which is hereby incorporated by reference in its entirety.

FIELD OF THE INVENTION

This invention relates to pool cleaning robots, and particularly to those which are powered by an externally supplied suction.

BACKGROUND OF THE INVENTION

Suction powered pool cleaning robots are well known. In general, such robots are adapted for use for cleaning a pool while being powered by an external vacuum and filtering system. The robot is designed to traverse, e.g., the bottom and/or side surfaces of the pool when attached to a hose of the vacuum system. Water which is drawn through the hose is typically filtered and returned to the pool. Thus, a main function of the robot is to carry the hose about the pool surfaces to be cleaned. Such robots may scan along a pre-determined path based on the arrangement of mechanical elements.

SUMMARY OF THE INVENTION

According to one aspect of the present invention, there is provided a suction-powered pool cleaning robot comprising:
 a fluid outlet, configured for connection to a suction hose, and a fluid inlet, with a fluid path therebetween;
 a turbine, which may be any suitable device is configured to extract energy, such as in the form of rotational motion, from a fluid flow, at least partially disposed within the fluid path so as to extract energy from flow of fluid therethrough; and
 an electrical control system configured to regulate at least some of the operations of the robot, the control system comprising an electrical generator for providing power to the control system and configured to be driven by the turbine, and an electronic controller configured for the regulation.

By providing an electrical control system as described above, it may operate in a self-sufficient manner, i.e., generating the electricity needed for operation of the electronic controller during normal operation of the robot.

The electrical control system may be housed within a sealed casing, the turbine being magnetically coupled to the electrical generator.

The suction-powered pool cleaning robot may further comprise:
 a housing;
 two drive wheels for providing locomotion of the robot and being disposed external to the housing on opposite sides thereof; and
 a drive mechanism configured to be driven by the turbine and to rotate the drive wheels independently of one another.

The electronic controller may be configured to perform the regulation by influencing the rotation of at least one of the drive wheels.

The drive mechanism may comprise two coaxial axles, each mounted with one of the drive wheels, with at least one of the axles constitutes a reversible axle and being configured to be selectively driven between two angular directions under unidirectional rotation of the turbine.

The drive mechanism may further comprise a drive gear configured to drive the reversible axle, the drive mechanism further comprising a reversing mechanism comprising:
 first and second selection gears in drive communication with the turbine such that they rotate in opposite angular directions from one other; and
 a drive selection mechanism configured to selectively engage (i.e., mesh with) no more than one of the selection gears with the drive gear.

The reversing mechanism may comprise a series of gears, including at least the selection gears, on a rocker mechanism configured to be pivoted between first and second positions; the rocker mechanism being disposed such that the first selection gear engages the drive gear in the first position of the rocker mechanism, and the second selection gear engages with the drive gear in the second position of the rocker mechanism.

The robot may further comprise a linear actuator, which may be a solenoid, controlled by the electronic controller, configured to pivot the rocker mechanism between its first and second positions.

The turbine may comprise a shaft extending into the drive mechanism and comprising worm mounted or formed thereon, and the drive mechanism may comprise a worm gear disposed so as to engage the worm.

According to another aspect of the present invention, there is provided a pool cleaning robot, which may be suction-powered, comprising a housing, two drive wheels for providing locomotion of the robot and being disposed external to the housing on opposite sides thereof, and a drive mechanism in drive communication with a source of mechanical motion and configured to rotate the drive wheels; the drive mechanism comprising at least one axle mounted with one of the drive wheels and a drive gear configured to drive it, the axle being in drive communication with a reversing mechanism comprising:
 first and second selection gears in drive communication with the source of mechanical motion such that they rotate in opposite angular directions from one other; and
 a drive selection mechanism configured to selectively engage no more than one of the selection gears with the drive gear.

The reversing mechanism may comprise a series of gears, including at least the selection gears, on a rocker mechanism configured to be pivoted between first and second positions; the rocker mechanism being disposed such that the first selection gear engages with the drive gear in the first position of the rocker mechanism, and the second selection gear engages with the drive gear in the second position of the rocker mechanism.

The rocker mechanism may have a substantially arcuate form (i.e., in the form of an arc), the gears having axes perpendicular to the arc, wherein the selection gears are disposed at extreme ends of the arc.

The rocker mechanism may comprise four gears and be configured to pivot about an axis which is coincidental with the axis of one of the gears.

The robot may further comprise a linear actuator, which may be a solenoid, configured to pivot the rocker mechanism between its first and second positions.

According to a further aspect of the present invention, there is provided a suction-powered pool cleaning robot comprising:

a housing;

a fluid outlet, configured for connection to a suction hose, and a fluid inlet, with a fluid path therebetween;

a turbine at least partially disposed within the fluid path so as to extract energy from flow of fluid therethrough;

an electrical generator two drive wheels for providing locomotion of the robot and being disposed external to the housing on opposite sides thereof;

a drive mechanism configured to be driven by the turbine and to rotate the drive wheels; and an electrical control system comprising an electrical generator configured to be driven by the turbine, and an electronic controller configured to detect the power output by the electrical generator and to determine, based on the output, that the robot has encountered an obstacle, such as a wall.

According to a still further aspect of the present invention, there is provided a suction-powered pool cleaning robot comprising:

a housing;

a fluid outlet, configured for connection to a suction hose, and a fluid inlet, with a fluid path therebetween;

a turbine at least partially disposed within the fluid path so as to extract energy from flow of fluid therethrough; and an electrical generator for providing power to the robot and configured to be driven by the turbine, and an electronic controller configured to regulate at least some of the operations of the robot;

the turbine being magnetically coupled to the electrical generator.

At least the electrical generator may be housed within a sealed casing.

BRIEF DESCRIPTION OF THE DRAWINGS

In order to understand the invention and to see how it may be carried out in practice, an embodiment will now be described, by way of a non-limiting example only, with reference to the accompanying drawings, in which.

DETAILED DESCRIPTION OF EMBODIMENTS

Figure 1A:
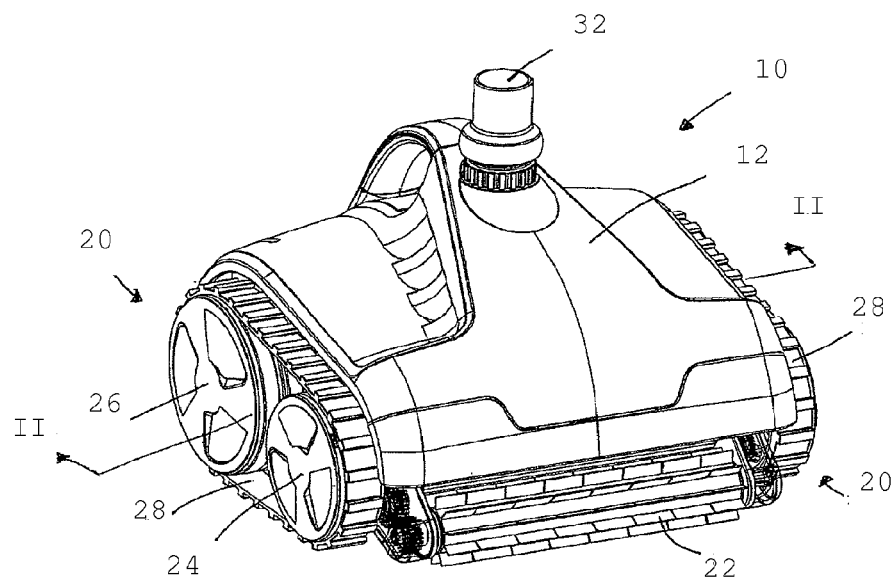
FIGS. 1A and 1B are top and bottom perspective views, respectively, of a robot according to the present invention.
Figure 1B:
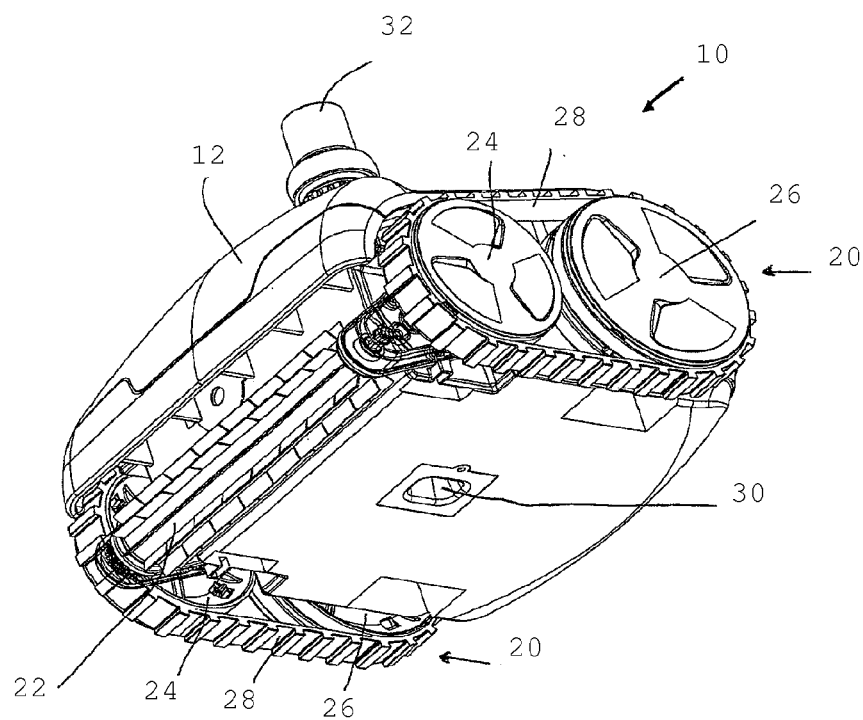
Figure 1C:
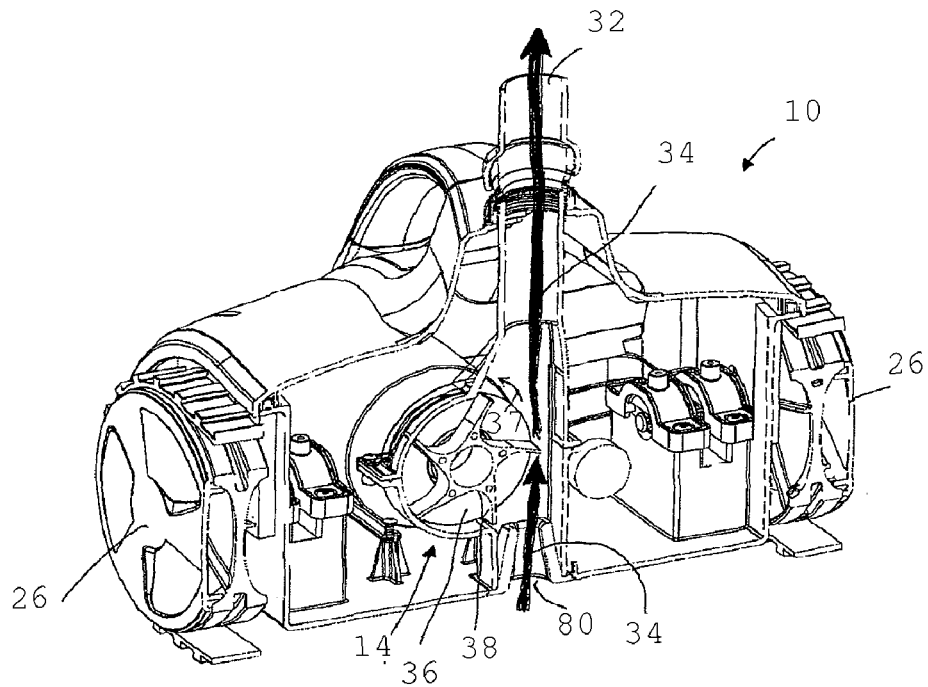
FIG. 1C is a cross-section view of the robot, taken along line II-II in FIG. 1A.
Figure 1D:
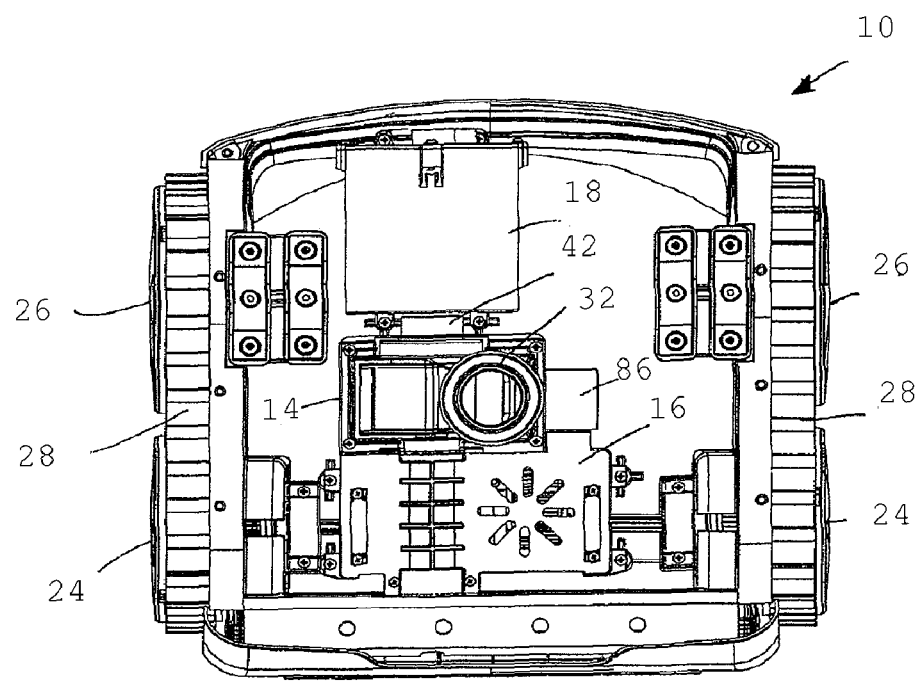
FIG. 1D is a top view of the robot, with a cover portion of a housing thereof removed.

As illustrated in FIGS. 1A through 1D, there is provided a suction-powered pool cleaning robot, which is generally indicated at 10. The robot comprises a main housing 12, which contains therewithin a water flow unit 14, a drive unit 16, and a sealed control unit 18. The robot 10 comprises, exterior to the housing 12, two track assemblies 20 on opposite sides of the housing, and a brushwheel 22. Each track assembly comprises a drive wheel 24, a free wheel 26, and a track 28 thereabout.

The water flow unit 14 is designed to be connected to an external suction source (not illustrated), which draws water and debris from the bottom of the pool and filters it before returning it to the pool. Thus, the flow unit 14 comprises a fluid inlet 30, adapted to be disposed, during use, facing and substantially adjacent the pool floor, and a fluid outlet 32, which is adapted to be attached to a suction hose (not illustrated) which is in fluid communication with the external suction source. A fluid path, indicated by arrows 34 and through which the water drawn through the inlet 30 passes before exiting via the outlet 32 passes, is defined between the inlet and the outlet.

Figure 2:
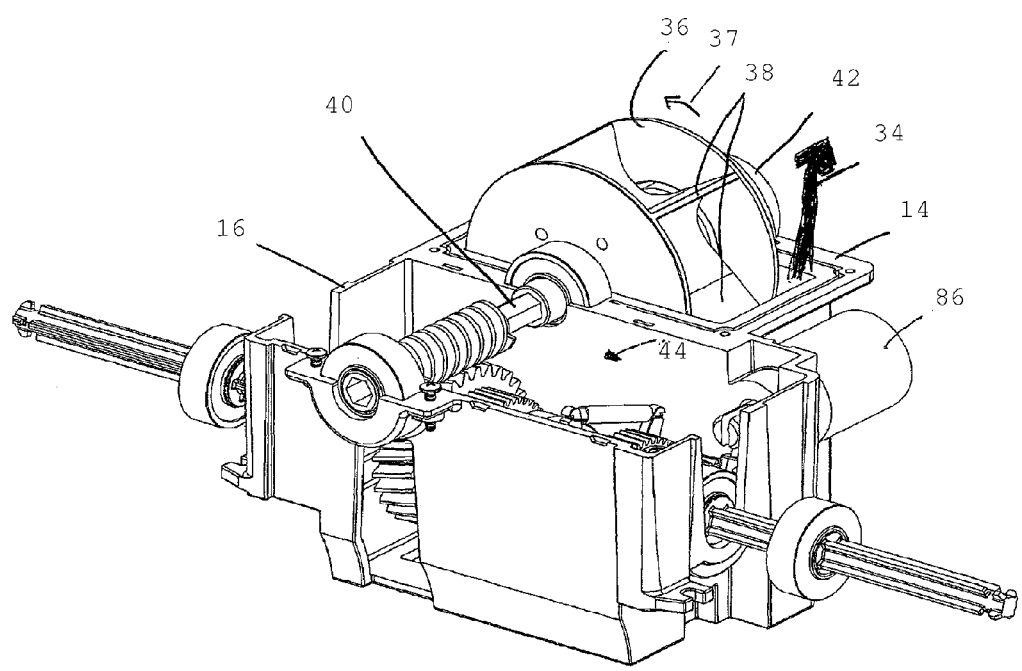
FIG. 2 is a perspective view of a water flow unit and a drive unit of the robot, with their respective covers removed.

As illustrated in FIG. 2, the flow unit 14 further comprises a turbine 36, which is disposed such that some of its blades 38 are disposed within the fluid path. Water flowing from the inlet 30 to the outlet 32 rotates the turbine 36 in a working direction, as indicated by arrows 37. The turbine 36 is associated with two shafts, e.g., coupled thereto or integral therewith, projecting from both sides thereof. A mechanical drive shaft 40 projects into the drive unit 16, and a power shaft 42 projects toward the control unit 18. Further constructional and functional considerations of the two shafts 40, 42 will be described below.

Figure 3A:
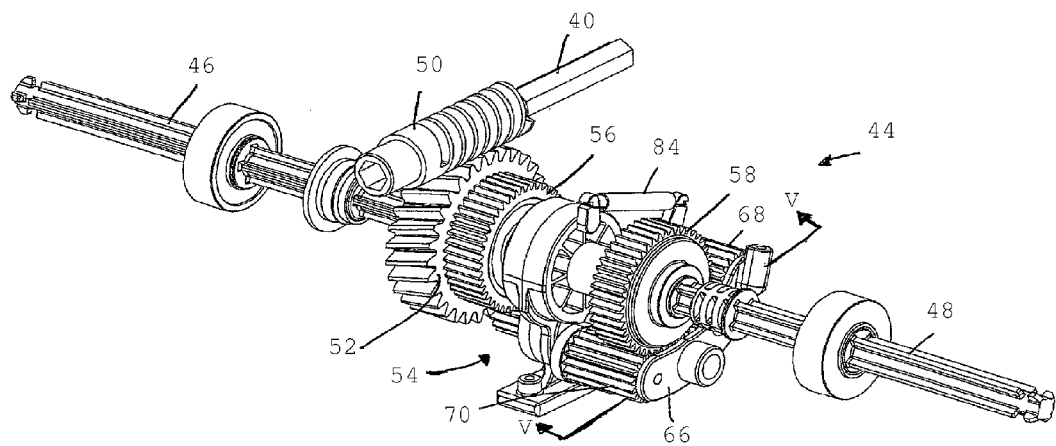
FIGS. 3A and 3B are front and rear perspective views, respectively, of a drive mechanism of the robot.
Figure 3B:
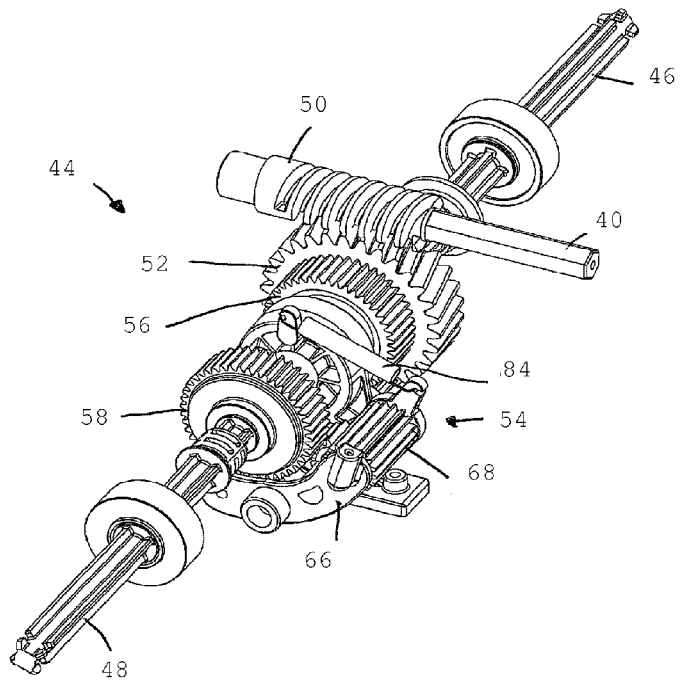

As best seen in FIGS. 3A and 3B (with the mechanical drive shaft 40 included for reference), the drive unit 16 comprises a drive mechanism, which is generally indicated at 44 and is designed to use mechanical motion provided by the mechanical drive shaft 40 to provide angular motion to (i.e., rotate) the drive wheels 24 of the track assemblies 20. Each drive wheel 24 may be rotated in the same angular direction, resulting in the robot 10 being driven in a substantially straight path, or in opposite angular directions, resulting in the robot 10 pivoting. Thus, the drive mechanism 44 comprises two axles: a constant axle 46, which always rotates in the same angular direction when the turbine rotates in its working direction, and a reversible axle 48, which may rotate in either direction when the turbine rotates in its working direction, as will be explained below. Each of the axles 46, 48 is mounted with and drives one of the drive wheels 24.

The constant axle 46 and its associated drive wheel 24 are driven directly by the mechanical drive shaft 40 of the turbine 36. The mechanical drive shaft 40 comprises a worm 50, either mounted thereon or formed integrally therewith. A worm gear 52 (e.g., a helical gear) is mounted on the constant axle 46 to cooperate with the worm 50 for rotating the constant axle upon rotation of the mechanical drive shaft 40. It will be appreciated that by providing this direct drive relationship between the constant axle 46 and the mechanical drive shaft 40, any reduction in speed of the robot caused by an external source will result in a reduction in speed of the turbine, irrespective of the rate of flow of water through the fluid path. The significance of this will be explained below.

The reversible axle 48 is driven by a gear train, generally indicated at 54, and which comprises first and second transmission gears 56, 58, each mounted to one of the constant axle 46 and the reversible axle 48, respectively, such that it rotates in tandem therewith, a transmission rod 60 (illustrated in hidden lines in FIG. 4) with first and second rod gears 62, 64 mounted thereto, and a reversing mechanism 66. The first transmission gear 56 may be formed integrally with the worm gear 52.

Figure 4:
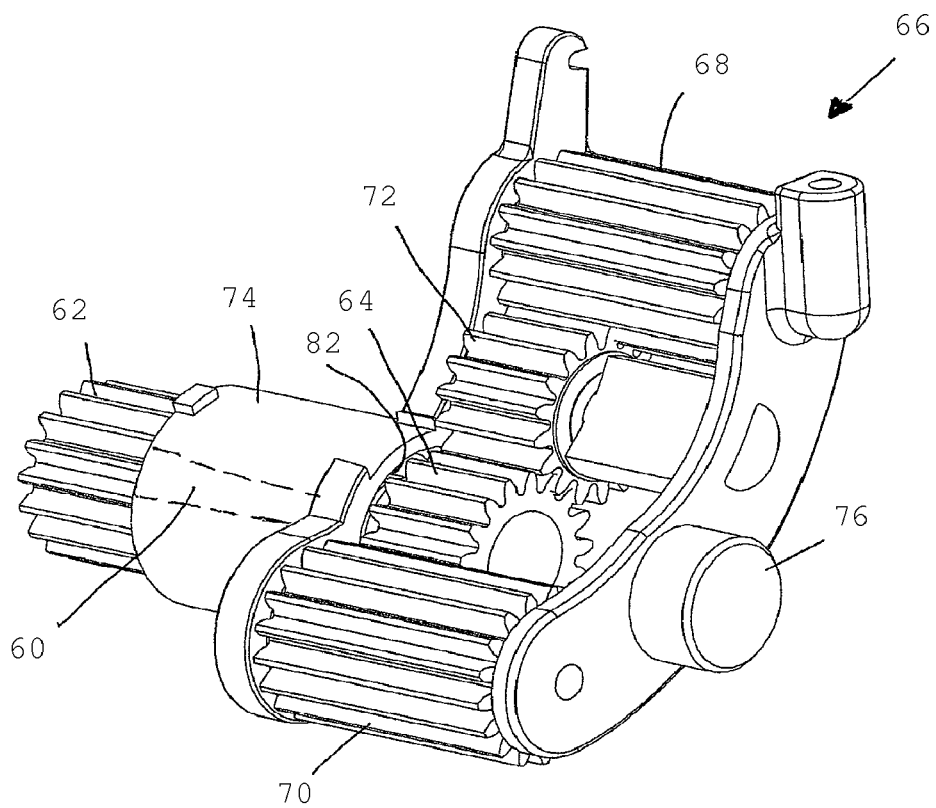
FIG. 4 is a detailed view of a portion of a gear train of the drive mechanism illustrated in FIGS. 3A and 3B.

As best illustrated in FIG. 4, the reversing mechanism 66 is formed as an arcuate rocker mechanism, with four gears arranged parallely along its length. The extreme gears constitute first and second selection gears 68, 70. One of the interior gears of the reversing mechanism 66 is the second rod gear 64. The other interior gear is a reversing gear 72. The reversing mechanism 66 comprises first and second rocker supports 74, 76, formed as round projections and disposed coaxially to one another, which are used to support and balance the reversing mechanism 66. Portions which are integrally formed with or rigidly attached to the drive unit 16 on either side of the reversing mechanism 66 are formed with round apertures adapted to snuggly receive therein the rocker supports 74, 76, while still allowing them to rotate therein (e.g., a rolling element bearing, not illustrated, may be provided within each aperture). The first rocker support 74 is formed with a through-going aperture 82 adapted to rotatably receive therein the transmission rod 60 and/or the second rod gear 64. (The through-going aperture 82 may be formed with two different internal diameters so as to rotatably receive therein both the transmission rod 60 and the second rod gear 64.) Thus, the axis about which the reversing mechanism 66 pivots is the same axis about which the second rod gear 64 rotates.

Figure 5A:
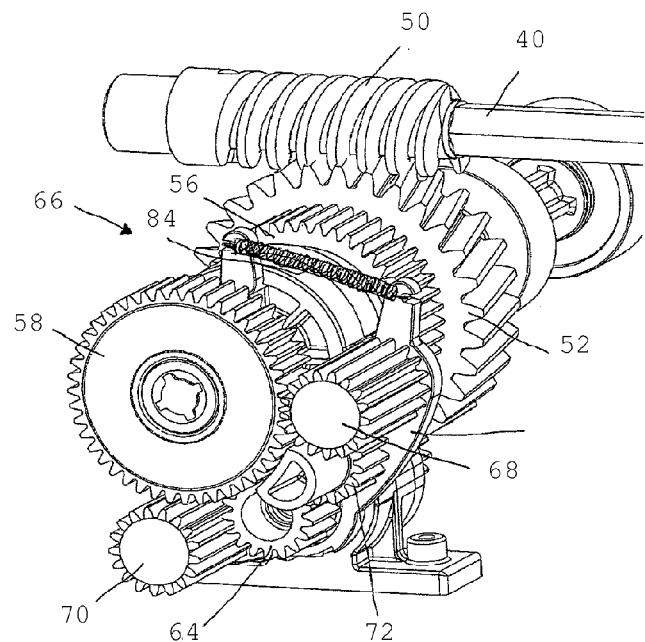
FIGS. 5A and 5B are cross-sectional perspective views of the drive unit, illustrating a reversing mechanism thereof in its respective first and second operating positions, taken along line V-V in FIG. 3A.

A biasing member, such as a spring 84, is provided to keep the reversing mechanism 66, in the absence of any external force, in its first operating position, i.e., pivoted such that the first selection gear 68 engages (i.e., is meshed with) the second transmission gear 58, as illustrated in FIG. 5A.

As there are four gear meshings in the gear train between the first and second transmission gears 56, 58 when the reversing mechanism 66 is in its first operating position (a first between the first transmission gear and the first rod gear 62; a second between the second rod gear 64, which rotates with the first rod gear, and the reversing gear 72; a third between the reversing gear and the first selection gear 68; a fourth between the first selection gear and the second transmission gear), both transmission gears, and thus both the constant axle 46 and the reversible axle 48, rotate in the same direction when the reversing mechanism 66 is in its first operating position. (It is well known that each meshing between two gears such as spur gears results in the two gears rotating in opposite directions. Thus, an odd number of meshings between two gears results in the gears rotating in opposite directions, while an even number of meshings between two gears results in the gears rotating in the same direction.)

Figure 5B:
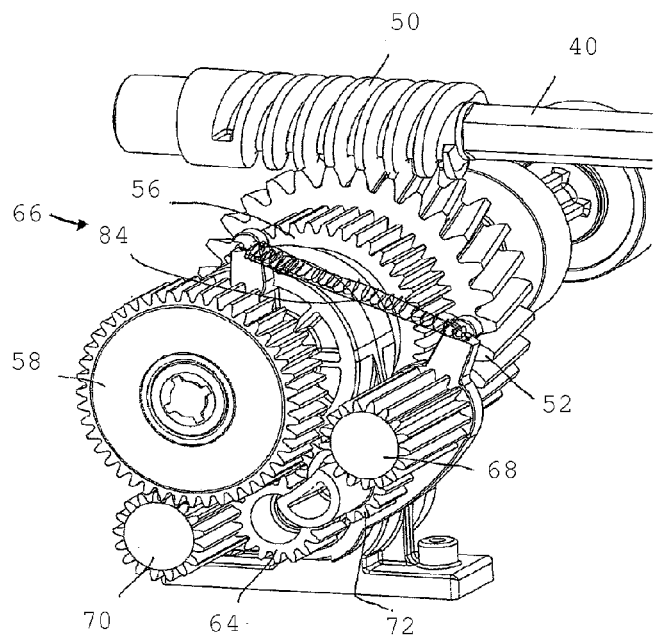

When the reversing mechanism 66 is in its second position, as illustrated in FIG. 5B, the second selection gear 70 engages the second transmission gear 58. As there are three gear meshings in the gear train between the first and second transmission gears 56, 58 when the reversing mechanism 66 is in its second operating position (a first between the first transmission gear and the first rod gear 62; a second between the second rod gear 64, which rotates with the first rod gear, and second selection gear 70; a third between the second selection gear and the second transmission gear), the transmission gears, and thus both the constant axle 46 and the reversible axle 48, rotate in opposite directions when the reversing mechanism 66 is in its second operating position. In this way turning of the robot (i.e., pivoting about a vertical axis) is enabled.

Figure 6A:
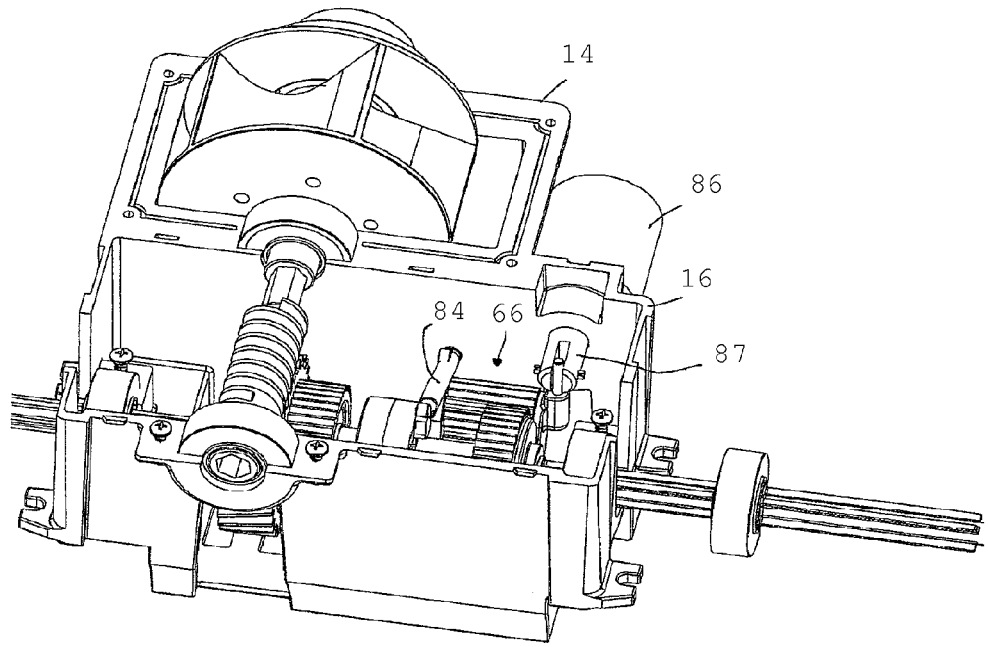
FIGS. 6A and 6B are top perspective views of the water flow unit and drive unit, with the reversing mechanism in its respective first and second operating positions.
Figure 6B:
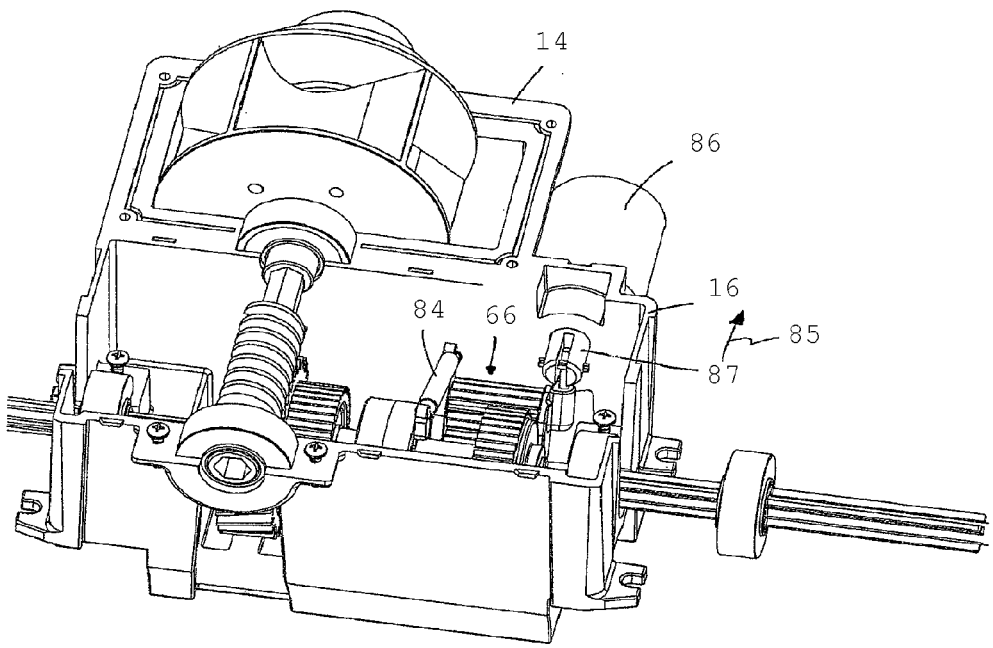

In order to facilitate the pivoting of the reversing mechanism 66 between its first and second operating positions, a linear actuator 86 (such as illustrated in FIGS. 6A and 6B), such as a solenoid, may be provided, e.g., external to the drive unit 16, whose actuator arm 87 projects into the drive unit and is pivotally articulated to the reversing mechanism 66 such that actuation thereof pivots the reversing mechanism between its first and second operating positions. In the "rest" state of the linear actuator 86 (i.e., when no current is applied thereto), as illustrated in FIG. 6A, the actuator arm 87 is fully extended. The spring 84 ensures that the actuator arm 87 is in this position, and thus that the reversing mechanism 66 maintains its first operating position, when the linear actuator is in its rest state. In the "active" state of the linear actuator 86 (i.e., when a current is applied thereto, causing linear movement of the actuator arm 87 in a direction indicated by arrow 85), as illustrated in FIG. 6B, the reversing mechanism 66 is brought into its second operating position.

It will be appreciated that as the operating position of the reversing mechanism 66 determines whether the robot 10 follows a substantially straight trajectory or executes a turn, the direction of movement of the robot may be controlled by the linear actuator 86.

In addition to the above-mentioned components, it will be appreciated that the drive unit 16 and/or the drive mechanism 44 comprise a number of bushings, bearings, etc., as necessary to ensure efficient operation of the drive mechanism.

Figure 7:
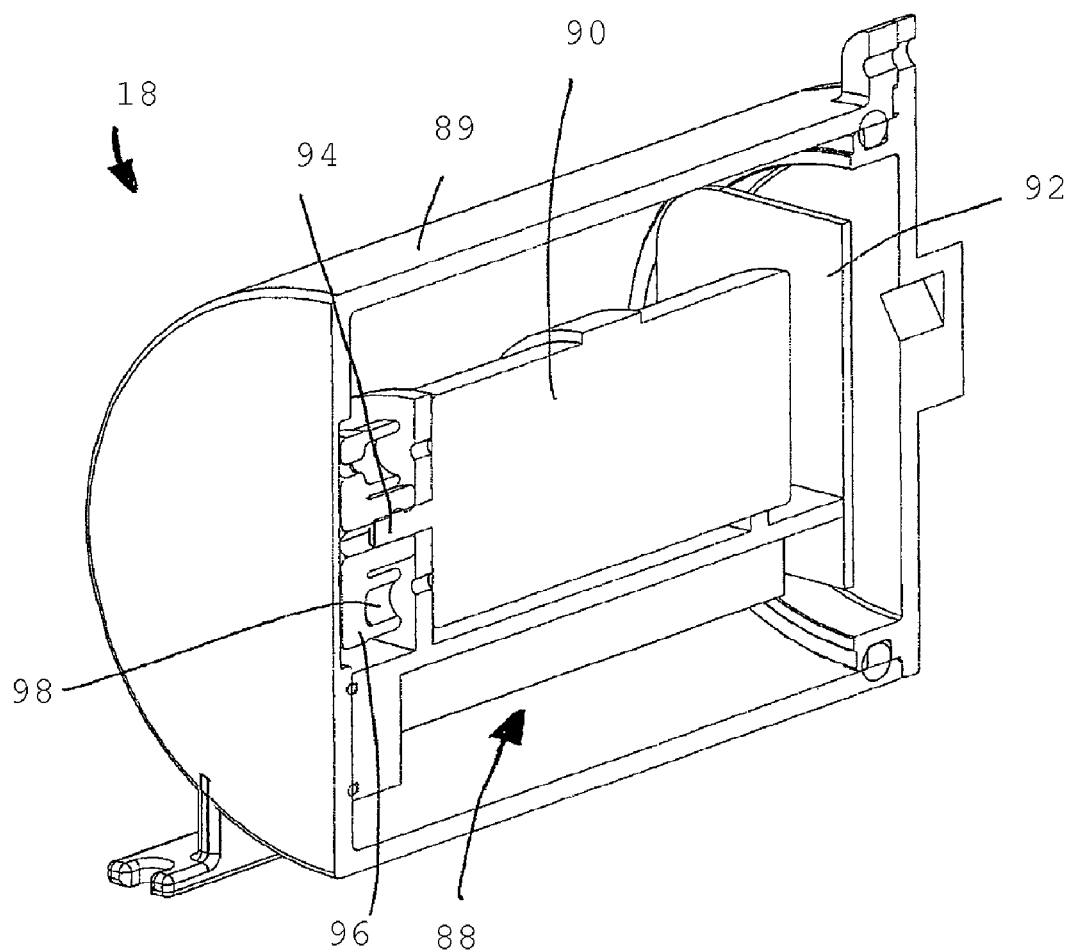
FIG. 7 is a cross-sectional view of a control unit of the robot.

As illustrated in FIG. 7, the control unit 18 is a sealed compartment 89, and comprises an electrical control system, which is generally indicated at 88. The control system 88 is self-contained and self-sufficient, i.e., it comprises all components necessary to generate its own power at least during normal use of the robot 10 and to direct operation thereof. As such, it comprises an electrical generator 90 and an electronic controller 92. The electrical generator 90 provides all the power necessary for the electronic controller 92. In addition, a rechargeable battery or high-capacity capacitor (neither illustrated) may be provided to store an amount of backup power which may be necessary to power the electronic controller 92 during brief intervals when the generator 90 is not providing power. Since, as noted above, the control unit 18 is housed in a sealed compartment, ingress of water thereto, and subsequent damage thereby to components of the electrical control system 88, is prevented.

The electrical generator 90 can be any known generator, such as a dynamo, and is driven by the rotation of the turbine 36. In order to maintain the control unit 18 as a sealed compartment, the power shaft 42 of the turbine 36 and the shaft 94 of the generator 90 may be magnetically coupled to one another (the juxtaposition of the power shaft of the turbine and the control unit is illustrated, e.g., in FIG. 1D). Thus, the power shaft 42 of the turbine 36 comprises magnets embedded therein, at least on or near the face thereof which substantially abuts the control unit 18. Similarly, the generator is arranged within the control unit such that the generator shaft 94 faces the interior wall of the control unit 18 which faces the turbine 36. A disk 96 with magnets 98 embedded therein may be provided on the generator shaft 94 to be coupled with the power shaft 42 of the turbine 36 and to drive the generator shaft. Thus, as there is no physical contact necessary between the power shaft 42 of the turbine 36 and the generator shaft 94, it is not necessary to utilize any mechanism to couple the turbine and the generator 90 which may compromise the seal of the control unit 18.

The electronic controller 92 may be any known controller which may direct/regulate at least some of the operations of the robot, such as an integrated circuit, etc. It may be adapted to be pre-programmed with any known or novel scanning algorithm. In order to control the direction of movement of the robot 10, it controls the linear actuator 86. Wire leads (not illustrated) between the controller 92 and the actuator 86 carry control signals thereto. Since the leads are not moving parts, they may be passed from the controller 92 within the control unit 18 to the linear actuator 86 via an opening which may be subsequently sealed. Thus, the seal of the control unit 18 is maintained.

In addition, the electronic controller 92 may be adapted to detect a wall, or any similar obstacle, based on feedback from the generator 90. As explained above, due to the direct drive relationship between the constant axle 46 and the mechanical drive shaft 40, any reduction in speed of the robot 10 caused by an external source will result in a reduction in speed of the turbine 36, irrespective of the rate of flow of water through the fluid path. The reduced speed of the turbine 36 results in a reduced speed of the generator 90, which is associated with a lower electrical output than is associated with the generator when the robot 10 moves at its normal speed. Consequently, when a wall is encountered, the reduction of speed of the robot 10 can be detected by the controller 92 by measuring a reduced electrical output of the generator 90. As the robot 10 may temporarily experience a reduction in speed for reasons other than encountering a wall, the controller 92 may be adapted to determine that a wall has been encountered when one or more specific criteria associated with the reduction in power output by the generator, such as a predetermined time over which the output is reduced, the amount of the reduction, etc.

It will be appreciated that the generator 90 and the controller 92 may each be housed in separate sealed compartments, and electrically connected via wire leads, with the points of entry of the leads into each container being sealed.

Those skilled in the art to which this invention pertains will readily appreciate that numerous changes, variations and modifications can be made without departing from the scope of the invention mutatis mutandis.

The invention claimed is:

1. A suction-powered pool cleaning robot comprising:
a fluid outlet, adapted for connection to a suction hose, and a fluid inlet, with a fluid path therebetween;
a turbine at least partially disposed within the fluid path so as to extract energy from flow of fluid therethrough;
an electrical control system adapted to regulate at least some of the operations of the robot, said control system comprising an electrical generator for providing power thereto and adapted to be driven by the turbine, and an electronic controller adapted for the regulation;
wherein the suction-powered cleaning robot is arranged to reduce a speed as a result in a reduction in a speed of the suction-powered pool cleaning robot caused by an external source, irrespective of a rate of flow of water through the fluid path;
a housing; and
two drive wheels for providing locomotion of the robot and being disposed external to the housing on opposite sides thereof; and a drive mechanism adapted to be driven by the turbine and to rotate said drive wheels independently of one another; wherein the drive mechanism comprises a constant axle that drives at least one drive wheel and is a direct communication with a mechanical drive shaft driven by the turbine;
wherein said drive mechanism further comprises a reversible axle, wherein the reversible axle and the constant axle are coaxial; wherein the constant axle drives one of the drive wheels and is in a direct drive relationship with a mechanical drive shaft of the source of mechanical motion; wherein the reversible axle is mounted with a second of said drive wheels and a drive gear adapted to drive it, said reversible axle being in drive communication with a reversing mechanism comprising: first and second selection gears in drive communication with the source of mechanical motion such that they rotate in opposite angular directions from one other; and a drive selection mechanism adapted to selectively engage no more than one of said selection gears with said drive gear;
wherein said drive mechanism further comprising a drive gear adapted to drive said reversible axle, said drive mechanism further comprising a reversing mechanism comprising: first and second selection gears in drive communication with the turbine such that they rotate in opposite angular directions from one other; and a drive selection mechanism adapted to selectively engage no more than one of said selection gears with said drive gear;
wherein said reversing mechanism comprises a series of gears, including at least said selection gears, on a rocker mechanism adapted to be pivoted between first and second positions; said rocker mechanism being disposed such that the first selection gear engages with said drive gear in the first position of the rocker mechanism and the second selection gear engages with said drive gear in the second position of the rocker mechanism.

2. A suction-powered pool cleaning robot according to claim 1, further comprising a linear actuator, controlled by said electronic controller, adapted to pivot said rocker mechanism between its first and second positions.

3. A suction-powered pool cleaning robot according to claim 2, wherein said linear actuator is a solenoid.

4. A pool cleaning robot comprising a housing, two drive wheels for providing locomotion of the robot and being disposed external to the housing on opposite sides thereof, and a drive mechanism in drive communication with a source of mechanical motion and adapted to rotate said drive wheels;
said drive mechanism comprising a constant axle and a reversible axes that are coaxial;
wherein the constant axle drives one of the drive wheels and is in a direct drive relationship with a mechanical drive shaft of the source of mechanical motion;
wherein the reversible axis is mounted with a second of said drive wheels and a drive gear adapted to drive it, said reversible axle being in drive communication with a reversing mechanism comprising: first and second selection gears in drive communication with the source of mechanical motion such that they rotate in opposite angular directions from one other; and a drive selection mechanism adapted to selectively engage no more than one of said selection gears with said drive gear;
wherein said reversing mechanism comprises a series of gears, including at least said selection gears, on a rocker mechanism adapted to be pivoted between first and second positions; said rocker mechanism being disposed such that the first selection gear engages with said drive gear in the first position of the rocker mechanism, and the second selection gear engages with said drive gear in the second position of the rocker mechanism.

5. A pool cleaning robot according to claim 4, said rocker having a substantially arcuate form, said gears having axes perpendicular to the arc, wherein said selection gears are disposed at extreme ends of the arc wherein the axes of the gears are positioned along the arc.

6. A pool cleaning robot according to claim 5, said rocker mechanism comprising four gears and being adapted to pivot about an axis which is coincidental with the axis of one of said gears.

7. A pool cleaning robot according to claim 4, further comprising a linear actuator adapted to pivot said rocker mechanism between its first and second positions.

8. A pool cleaning robot according to claim 7, wherein said linear actuator is a solenoid.

* * * * *